Figure 1:
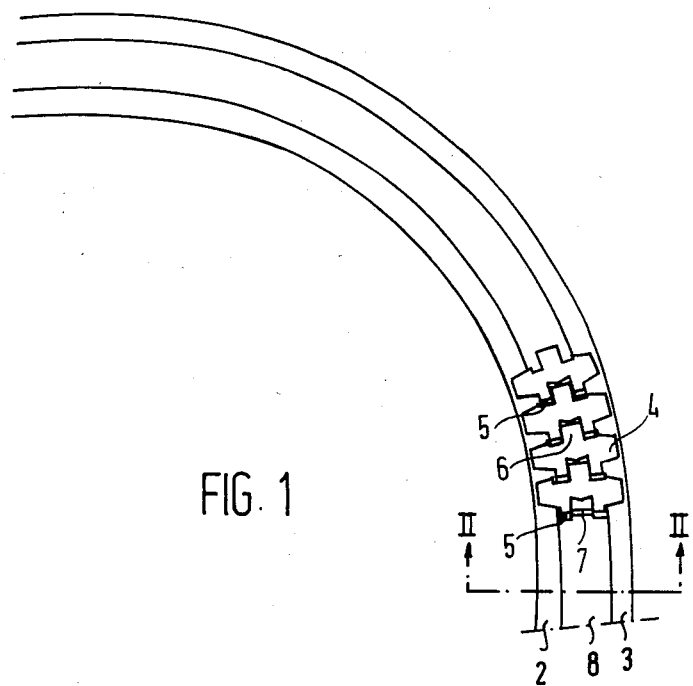

United States Patent [19]

van Zijderveld, Jr.

[11] Patent Number: 4,805,764
[45] Date of Patent: Feb. 21, 1989

[54] CHAIN CONVEYOR, A CONVEYOR CHAIN AND A BEND SEGMENT FOR THE TRACK OF SUCH CHAIN CONVEYOR

[75] Inventor: George J. van Zijderveld, Jr., 's-Gravenzande, Netherlands

[73] Assignee: M.C.C. Nederland B.V., Gravenzande, Netherlands

[21] Appl. No.: 176,143

[22] Filed: Mar. 31, 1988

[30] Foreign Application Priority Data

Apr. 6, 1987 [NL] Netherlands ............... 8700801

[51] Int. Cl.$^4$ .................... B65G 17/06; B65G 23/18
[52] U.S. Cl. ............................... 198/805; 198/831
[58] Field of Search ................. 198/805, 831, 852

[56] References Cited

FOREIGN PATENT DOCUMENTS 0207577  1/1987  European Pat. Off. .
2037690 12/1982  United Kingdom .
2182296  5/1987  United Kingdom .

*Primary Examiner*—Andres Kashnikow
*Assistant Examiner*—Karen B. Merritt
*Attorney, Agent, or Firm*—Morgan & Finnegan

[57] ABSTRACT

A chain conveyor is described, which comprises a track including at least one bend zone and a conveyor chain. The track comprises two spaced parallel rails over which the chain can move. The chain has links presenting a substantially rectangular carrying surface made of synthetic plastics material and a connecting system situated below the carrying surface and including hinge eyes on opposite sides of each link and a hinge pin of ferromagnetic material passed through the hinge eyes of each pair of adjacent links, thereby hinging adjacent links together. The chain is capable of flexing not only about the hinge pins but also in the plane of transport defined by the carrying surfaces of the successive links. Guide surfaces depend from the underside of the carrying surfaces for guiding the chain laterally relative to the rails. The maximum perpendicular distance between these guide surfaces is shorter than the minimum perpendicular distance between the guide surfaces formed on the rails. Exclusively in the bend zones of the track, in the space between the two rails, under the connecting system of the links, means are provided for generating a magnetic field to exercise attraction on the hinge pins and thereby to hold the chain flat on the rails in the bend zone.

16 Claims, 1 Drawing Sheet

U.S. Patent     Feb. 21, 1989     4,805,764

CHAIN CONVEYOR, A CONVEYOR CHAIN AND A BEND SEGMENT FOR THE TRACK OF SUCH CHAIN CONVEYOR

This invention relates to a chain conveyor comprising a track including at least one bend zone and a conveyor chain, said track comprising two spaced parallel rails over which the chain can move, said chain having links presenting a substantially rectangular carrying surface made of synthetic plastics material and a connecting system situated below said carrying surface and including at least two spaced eyes on one side of the link, at least one eye situated intermediate said spaced eyes on the opposite side of the link, and a hinge pin for hinging adjacent links together, said hinge pin being embraced by the at least two spaced eyes connected to one of the links and the at least one eye situated intermediate said spaced eyes and connected to an adjacent link, the carrying surfaces, the hinge pin and the hinge eyes being designed so that the chain is capable of flexing not only about the hinge pins but also in the plane of transport defined by the carrying surfaces of the successive links, and guide surfaces depending from the underside of the carrying surfaces for guiding the chain laterally relatively to the rails.

A chain conveyor of this kind for the transport of bottles, tins, boxes and like containers is disclosed in U.S. Pat. No. 3,262,550. In it, in order to prevent that, during operation, owing to the tensile forces within the chain, the chain links are lifted off the track in a bend on the outside bend side, guide surfaces are formed on the chain links under the carrying surface, which guide surfaces diverge from the carrying surface and, in the bends, cooperate with corresponding guide surfaces provided in the track.

Such mechanical means for keeping a conveyor chain flat on the track in a bend have a number of disadvantages. In addition to the inevitable guide means on the bend sections of the track, they require guide surfaces on all chain links, which in one way or another project or slope laterally, and lead to excessive wear and tear, because the guide surfaces are pressed against the track in the bend section.

Another drawback of mechanical chain guides of the subject kind, in which, in the bend, guide surfaces of each chain link engage under a corresponding guide surface of the track, in one way or another, is that contaminations, such as fragments of broken bottles fall onto the rails or between the guide surfaces, and may damage the surfaces in question, especially if they are made of a synthetic plastics selected for its low-friction properties. Moreover, these contaminations and damage lead to increased friction, which is quite considerable as it is, so that still higher driving power is required, and an increased noise level is caused.

GB-A No. 2,037,690 discloses a chain conveyor of the subject kind in which the conveyor chain is kept in flat condition in the bends of the track by magnetic forces. That conveyor, however, is designed for the use of a conveyor chain having links made of a ferromagnetic material. Chains of that kind find application in bottling lines of, e.g. breweries and the soft-drink industry, and need lubrication for the chain to run smoothly over the track. Chains with a carrying surface of synthetic plastics, however, find application in conveyors for boxes, tins, small bottles, plastics containers and the like, in short all containers which are prone to be damaged by a chain with a metallic carrying surface, and which preferably must not become moist or soiled as a result of chain lubrification. Such plastics chains have the additional advantage of producing little noise.

The use of magnetic force for keeping a conveyor chain of the kind described in GB-A No. 2,037,690 in flat condition in the bends of a track has the advantages that the guide surfaces formed under the carrying surfaces are not subjected to additional wear and tear as the chain is held in flat condition in the bends of the track; that, as a result of the absence of friction between the rails and the guide surfaces the nominal power for driving the chain may be lower; and that the chain movement is smooth and low in noise.

When dirt accumulates on the track, the chains are lifted over the dirt, but remain under the influence of the magnetic field, so that the chain is prevented from tilting and from jumping the rails. After the passage of the contaminations, the chain is again firmly pulled into contact with the track. In the case of grave contaminations of the track, the chain can easily be lifted off the track to remove particles or other dirt between the rails, which could otherwise cause the chain to stall or break.

The use of the magnetic bend described in GB-A No. 2,037,690 with a plastics chain as described in U.S. Pat. No. 3,262,550 would naturally have huge advantages, but this idea has always been discarded as an impossibility, because as it is, plastics are insensitive to magnetic force. German Gebrauchsmuster No. 8530825 has tried to provide a solution for this problem, it is true, by adding to the plastics a ferromagnetic powder, so that the chain link made from such plastics can be attracted by a magnet provided in the guide rail. The addition of a magnetizable material to the plastics, however, is economically unattractive, while, for a good attraction of the chain links large amounts of ferromagnetic powder are required, which adversely affects the favourable properties of the plastics, and in particular decreases the strength of the chain links.

The present invention is based on the surprising insight that it is yet possible for the plastics chain to be kept in flat condition in the bend zone of a conveyor track by means of magnetic force without requiring any modification of the plastics material or the addition of any material to it.

The present invention accordingly provides a chain conveyor of the kind defined in the opening paragraph, which is described in U.S. Pat. No. 3,262,550, and which in accordance with the present invention is characterized in that the connecting system of the links consists at least in part of a ferromagnetic material, that, exclusively in the bend zones of the track, in the space between the two rails, under the connecting system of the links, means are provided for generating a magnetic field, and that the maximum perpendicular distance between the guide surfaces formed on the carrying surfaces of the links is shorter than the minimum perpendicular distance between the guide surfaces formed on the rails.

According to the present invention, it has been appreciated that the favourable properties of a plastics chain, i.e., it is less apt to damage articles being transported, and is low in noise, are based on the carrying surfaces being made of plastics, so that the connecting system, consisting of the hinge eyes and the hinge pin can be made responsive to, and can be subjected to, magnetic force. Although, naturally, it is possible for the hinge eyes to be made of a ferromagnetic material and to form these together with a plastics carrying surface into chain links, this tends to lead in most cases to an unduly expensive and hence uneconomic conveyor chain.

According to a preferred embodiment of the invention, therefore, use is made with advantage of the fact that the hinge pin, which mostly is already made of a steel which is not magnetizable, can be made of a ferromagnetic material without any problems or additional cost. Surprisingly, it has been found to be possible to exercise a sufficiently high force of attraction on such a hinge pin by means of a magnet provided under the hinge pin adjacent to the outer rail in the bend, so that the carrying surfaces of the chain, which tend to rise in the outside bend of the track are kept flat on the track. In view of the small dimensions of the hinge pin, and, accordingly, the light mass to be subjected to magnetic forces, it has been found favourable, for best results, i.e. for keeping the chain links flat in the bend zones even in the case of substantial attractive forces, that the magnetic field be so configured that the magnetic field lines extend throughout the entire hinge pin, rather than through an end portion thereof only. In a preferred embodiment of the invention, therefore, at least one permanent magnet is provided across the track, and, parallel to the carrying surface of the chain, a north pole is located adjacent one end of the hinge pin and a south pole adjacent the other, opposite end. As the poles of the magnet are in the top surface of the magnet, a maximal downward force is exercised on the hinge pin. Preferably, the north pole and the south pole respectively extend beyond the respective ends of the hinge pins. In this way, a magnetic field is formed, whose field lines extend, for as large a portion as possible, from the north pole, via the hinge pin, to the south pole.

The invention also relates to a conveyor chain for use in the chain conveyor according to the invention, in which the guide surfaces at the underside of the carrying surfaces extend substantially perpendicular thereto.

Finally, the invention relates to a bend segment for the track of the chain conveyor according to the invention.

Figure 2:
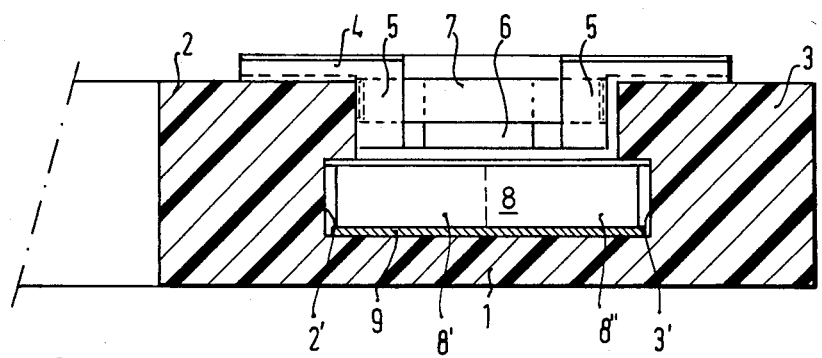

One embodiment of the invention will now be described, by way of example, with reference to the accompanying drawings, in which:

FIG. 1 shows a top plan view of a bend segment for the track of a chain conveyor according to the present invention; and FIG. 2 illustrates a cross-sectional view, taken on the line II—II of FIG. 1.

The preferred embodiment of the bend segment for a chain conveyor according to the invention is formed integrally of a synthetic plastics material and, in cross-section, has the shape of a U with a base portion 1 and two upright legs 2 and 3, the tops of which form the rails for the conveyor chain. The chain is composed of links 4, at least the carrying surface of which is made of synthetic plastics material, with spaced hinge eyes 5 at one side, and a central hinge eye 6 at the other. Preferably, the hinge eyes, too, are formed of synthetic plastics material in one treatment together with the carrying surface by means of injection molding. Hinge eyes 5 and 6 are interconnected by means of a hinge pin 7 made of a ferromagnetic material. In order that the chain can move upwards from the track even in the bend segments and thus is capable of passing contaminations in the track, and can be bodily lifted out of the track for maintenance purposes, the maximum distance between the guide surfaces formed by the outsides of hinge eyes 5 is less than the minimum distance between the opposed guide surfaces formed by the insides of the upright legs 2 and 3. Preferably, the guide surfaces at the hinge eyes 5 extend perpendicularly to the carrying surface of the chain link 4, and the insides of legs 2 and 3 are also perpendicular to the plane of the rails. This makes for simple manufacture of both the bend segment and the chain links.

As shown in FIG. 2, a permanent magnet 8 is placed against the inner surface at the underside of the bend segment. The polarity of this magnet has been so selected that, for as large a part as possible, the magnetic field lines extend through hinge pin 7 and exercise a downward force thereon to keep the links flat on the rails in the bend zone. With advantage, a magnet can be used for this purpose, of which, as viewed in FIG. 2, the left-hand half has a north pole at the top and a south pole at the bottom, and the right-hand half has a south pole at the top and a north pole at the bottom. Magnet 8 may consist of one single magnet, but alternatively of two separate magnet halves 8' and 8" as shown dotted in FIG. 2. However, other configurations of magnets are possible, with which the object contemplated can be achieved.

Naturally, a plurality of magnets 8 can be placed, with or without interspaces, in line one behind the other in the longitudinal direction of the bend segment.

Preferably, a plate 9 of ferromagnetic material is provided under magnet 8. It has been found that, owing to the provision of such a closure plate, the magnetic force exercised on hinge pin 7 increases still further. It has also been found that, for optimum attraction, it is favourable when the ends of the magnet 8 project laterally beyond the respective pins of the hinge pin. For this purpose slots 2' and 3' are formed in the inner surfaces of the upright legs 2 and 3, respectively, which slots also serve to retain magnet 8 in the bend segment, thus preventing the magnet from being pulled against the chain. As the magnet projects beyond the ends of the hinge pin, it is ensured that a maximal downward force is exercised at any rate on the end of the hinge pin in the outer bend. This is of importance because, as a result of the tensile force on the chain, it tends to be lifted off in the outside bend of the rail.

It will be clear that the invention provides a surprising solution for keeping a chain made for the greater part of synthetic plastics material in flat condition in the bend zones of the track of a chain conveyor, thereby overcoming all disadvantages of using mechanical means for keeping the chain flat in the bend zones. Furthermore, it will be noted that the synthetic plastics material for the chain requires no adaptation whatsoever, so that it can be freely selected to suit customer specifications for optimum transport properties.

If desired, the underside of a similar bend segment forming part of the track for the return run of the conveyor chain can be arranged against the underside of the bend segment shown in FIG. 2, in order that the return run, too, can be guided and kept in contact with the track in the bend zones by means of magnetic force.

I claim:

1. A chain conveyor comprising a track including at least one bend zone and a conveyor chain, said track comprising two spaced parallel rails over which the chain can move, said chain having links presenting a substantially rectangular carrying surface made of synthetic plastics material and a connecting system situated below said carrying surface and including at least two spaced eyes on one side of the link, at least one eye situated intermediate said spaced eyes on the opposite side of the link, and a hinge pin for hinging adjacent links together, said hinge pin being embraced by the at least two spaced eyes connected to one of the links and the at least one eye situated intermediate said spaced eyes and connected to an adjacent link, the carrying surfaces, the hinge pins and the hinge eyes being designed so that the chain is capable of flexing not only about the hinge pins but also in the plane of transport defined by the carrying surfaces of the successive links, and guide surfaces depending from the underside of the carrying surfaces for guiding the chain laterally relative to the rails, characterized in that the connecting system of the links consists at least in part of a ferromagnetic material, that, exclusively in the bend zones of the track, in the space between the two rails, under the connecting system of the links, means are provided for generating a magnetic field, and that the maximum perpendicular distance between the guide surfaces formed on the carrying surfaces of the links is shorter than the minimum perpendicular distance between the guide surfaces formed on the rails.

2. A chain conveyor as claimed in claim 1, characterized in that the hinge pin is made of a ferromagnetic material and constitutes the part of the connecting system that is made of a ferromagnetic material, and that the means for generating a magnetic field comprise at least one permanent magnet across the track.

3. A chain conveyor as claimed in claim 2, characterized in that said at least one permanent magnet has a north pole adjacent one end of the hinge pin and a south pole adjacent the other, opposite end of the hinge pin.

4. A chain conveyor as claimed in claim 3, characterized in that the north pole and the south pole are contained in a plane extending parallel to the carrying surface of the chain at the top of said at least one permanent magnet.

5. A chain conveyor as claimed in claim 3 or 4, characterized by a plate of ferromagnetic material provided against the underside of said at least one permanent magnet.

6. A chain conveyor as claimed in claim 4, characterized in that the north pole and the south pole respectively extend laterally beyond the ends of the hinge pin.

7. A chain conveyor as claimed in claim 5, characterized in that the north pole and the south pole respectively extend laterally beyond the ends of the hinge pin.

8. A conveyor chain for a chain conveyor comprising a track including at least one bend zone, said track comprising two spaced parallel rails over which the chain can move, said chain having links presenting a substantially rectangular carrying surface made of synthetic plastics material and a connecting system situated below said carrying surface and including at least two spaced eyes on one side of the link, at least one eye situated intermediate said spaced eyes on the opposite side of the link, and a hinge pin for hinging adjacent links together, said hinge pin being embraced by the at least two spaced eyes connected to one of the links and the at least one eye situated intermediate said spaced eyes and connected to an adjacent link, the carrying surfaces, the hinge pins and the hinge eyes being designed so that the chain is capable of flexing not only about the hinge pins but also in the plane of transport defined by the carrying surfaces of the successive links, and guide surfaces depending from the underside of the carrying surfaces for guiding the chain laterally relative to the rails, characterized in that the connecting system of the links consists at least in part of a ferromagnetic material, that, exclusively in the bend zones of the track, in the space between the two rails, under the connecting system of the links, means are provided for generating a magnetic field, and that the maximum perpendicular distance between the guide surfaces formed on the carrying surfaces of the links is shorter than the minimum perpendicular distance between the guide surfaces formed on the rails and that the guide surfaces at the underside of the carrying surfaces extend substantially perpendicularly thereto.

9. A bend segment for a chain conveyor comprising a track and a conveyor chain, said track comprising two spaced parallel rails over which the chain can move, said chain having links presenting a substantially rectangular carrying surface made of synthetic plastics material and a connecting system situated below said carrying surface and including at least two spaced eyes on one side of the link, at least one eye situated intermediate said spaced eyes on the opposite side of the link, and a hinge pin for hinging adjacent links together, said hinge pin being embraced by the at least two spaced eyes connected to one of the links and the at least one eye situated intermediate said spaced eyes and connected to an adjacent link, the carrying surfaces, the hinge pins and the hinge eyes being designed so that the chain is capable of flexing not only about the hinge pins but also in the plane of transport defined by the carrying surfaces of the successive links, and guide surfaces depending from the underside of the carrying surfaces for guiding the chain laterally relative to the rails, characterized in that the connecting system of the links consists at least in part of a ferromagnetic material, that, exclusively in the bend zones of the track, in the space between the two rails, under the connecting system of the links, means are provided for generating a magnetic field, and that the maximum perpendicular distance between the guide surfaces formed on the carrying surfaces of the links is shorter than the minimum perpendicular distance between the guide surfaces formed on the rails.

10. A bend segment as claimed in claim 9, characterized in that the hinge pin is made of a ferromagnetic material and constitutes the part of the connecting system that is made of a ferromagnetic material, and that the means for generating a magnetic field comprise at least one permanent magnet across the track.

11. A bend segment as claimed in claim 10, characterized in that said at least one permanent magnet has a north pole adjacent one end of the hinge pin and a south pole adjacent the other, opposite end of the hinge pin.

12. A bend segment as claimed in claim 11, characterized in that the north pole and the south pole are contained in a plane extending parallel to the carrying surface of the chain at the top of said at least one permanent magnet.

13. A bend segment as claimed in claim 10 or 12, characterized by a plate of ferromagnetic material provided against the underside of said at least one permanent magnet.

14. A bend segment as claimed in claim 12, characterized in that the north pole and the south pole respectively extend laterally beyond the ends of the hinge pin.

15. A bend segment as claimed in claim 13, characterized in that the north pole and the south pole respectively extend laterally beyond the ends of the hinge pin.

16. A bend segment as claimed in claim 9, characterized by comprising a substantially U-shaped body made of synthetic plastics material, said U-shaped body having legs forming the rails and a base portion or connecting portion between the legs, which carries means for generating a magnetic field.

* * * * *

REEXAMINATION CERTIFICATE (1947th)
United States Patent [19]
van Zijderveld, Jr.

[11] B1 4,805,764

[45] Certificate Issued  Mar. 16, 1993

[54] CHAIN CONVEYOR, A CONVEYOR CHAIN AND A BEND SEGMENT FOR THE TRACK OF SUCH CHAIN CONVEYOR

[75] Inventor: George J. van Zijderveld, Jr., 's-Gravenzande, Netherlands

[73] Assignee: M.C.C. Nederland B.V., Gravenzande, Netherlands

Reexamination Request:
 No. 90/002,197, Nov. 9, 1990

Reexamination Certificate for:
 Patent No.: 4,805,764
 Issued: Feb. 21, 1989
 Appl. No.: 176,143
 Filed: Mar. 31, 1988

[30] Foreign Application Priority Data

Apr. 6, 1987 [NL] Netherlands ............ 8700801

[51] Int. Cl.⁵ .............. B65G 17/06; B65G 21/20; B65G 23/18
[52] U.S. Cl. ............................ 198/805; 198/831
[58] Field of Search ............... 198/805, 831, 852, 853

[56] References Cited

U.S. PATENT DOCUMENTS

| | | |
|---|---|---|
| 2,884,118 | 4/1959 | Williams . |
| 2,911,091 | 11/1959 | Imse ........................... 198/853 |
| 4,742,906 | 5/1988 | Wallaart ....................... 198/805 |
| 4,823,939 | 4/1989 | Langhans et al. ............ 198/805 |

FOREIGN PATENT DOCUMENTS

| | | |
|---|---|---|
| 207577 | 1/1987 | European Pat. Off. ......... 198/805 |
| 1115252 | 5/1968 | United Kingdom . |
| 2037690 | 7/1980 | United Kingdom ............ 198/805 |
| 2182296 | 5/1987 | United Kingdom ............ 198/805 |

OTHER PUBLICATIONS

Rexnord Catalog 933, *Rex Table Top Chains,* 1975 pp. 6, 12–17.

*Primary Examiner*—Joseph E. Valenza
*Attorney, Agent, or Firm*—Morgan & Finnegan

[57] ABSTRACT

A chain conveyor is described, which comprises a track including at least one bend zone and a conveyor chain. The track comprises two spaced parallel rails over which the chain can move. The chain has links presenting a substantially rectangular carrying surface made of synthetic plastics material and a connecting system situated below the carrying surface and including hinge eyes on opposite sides of each link and a hinge pin of ferromagnetic material passed through the hinge eyes of each pair of adjacent links, thereby hinging adjacent links together. The chain is capable of flexing not only about the hinge pins but also in the plane of transport defined by the carrying surfaces of the successive links. Guide surfaces depend from the underside of the carrying surfaces for guiding the chain laterally relative to the rails. The maximum perpendicular distance between these guide surfaces is shorter than the minimum perpendicular distance between the guide surfaces formed on the rails. Exclusively in the bend zones of the track, in the space between the two rails, under the connecting system of the links, means are provided for generating a magnetic field to exercise attraction on the hinge pins and thereby to hold the chain flat on the rails in the bend zone.

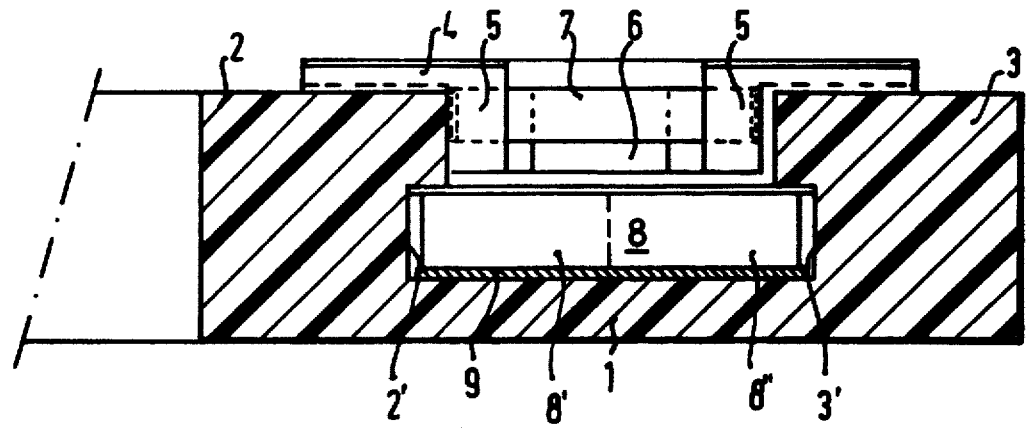

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2 and 8–10 are cancelled.

Claims 3, 11, 13 and 16 are determined to be patentable as amended.

Claims 4–7, 12, 14 and 15, dependent on an amended claim, are determined to be patentable.

New claims 17–19 are added and determined to be patentable.

3. A chain conveyor as claimed in claim [2] *17*, characterized in that said at least one permanent magnet has a north pole adjacent one end of the hinge pin and a south pole adjacent the other, opposite end of the hinge pin.

11. A bend segment as claimed in claim [10] *19*, characterized in that said at least one permanent magnet has a north pole adjacent one end of the hinge pin and a south pole adjacent the other, opposite end of the hinge pin.

13. A bend segment as claimed in claim [10 or] 12, characterized by a plate of ferromagnetic material provided against the underside of said at least one permanent magnet.

16. A bend segment as claimed in claim [9] *18*, characterized by comprising a substantially U-shaped body made of synthetic plastics material, said U-shaped body having legs forming the rails and a base portion or connecting portion between the legs, which carries means for generating a magnetic field.

*17. A chain conveyor comprising a track including at least one bend zone and a conveyor chain, said track comprising two spaced parallel rails over which the chain can move, said chain having links presenting a substantially rectangular carrying surface made of non-ferromagnetic synthetic plastics material and a connecting system situated below said carrying surface and including at least two spaced eyes on one side of the link, at least one eye situated intermediate said spaced eyes on the opposite side of the link, all eyes being made of non-ferromagnetic synthetic plastics material, and a hinge pin for hinging adjacent links together, said hinge pin being embraced by the at least two spaced eyes connected to one of the links and the at least one eye situated intermediate said spaced eyes and connected to an adjacent link, the carrying surfaces, the hinge pins and the hinge eyes being designed so that the chain is capable of flexing not only about the hinge pins but also in the plane of transport defined by the carrying surfaces of the successive links, and guide surfaces depending from the underside of the carrying surfaces for guiding the chain laterally relative to the rails, the maximum perpendicular distance between these guide surfaces being shorter than the minimum perpendicular distance between the guide surfaces formed on the rails, characterized in that the hinge pin of the connecting system of the links is made of a ferromagnetic material, that, exclusively in the bend zones of the track, in the space between the two rails, under the connecting system of the links, at least one permanent magnet is provided for generating a magnetic field, the magnetic field lines of which in substance extend through the hinge pin, to attract the hinge pin.*

*18. A conveyor chain for a chain conveyor comprising a track including at least one bend zone, said track comprising two spaced parallel rails over which the chain can move, said chain having links presenting a substantially rectangular carrying surface made of non-ferromagnetic synthetic plastics material and a connecting system situated below said carrying surface and including at least two spaced eyes on one side of the link, at least one eye situated intermediate said spaced eyes on the opposite side of the link, all eyes being made of non-ferromagnetic synthetic plastics material, and a hinge pin for hinging adjacent links together, said hinge pin being embraced by the at least two spaced eyes connected to one of the links and the at least one eye situated intermediate said spaced eyes and connected to an adjacent link, the carrying surfaces, the hinge pins and the hinge eyes being designed so that the chain is capable of flexing not only about the hinge pins but also in the plane of transport defined by the carrying surfaces of the successive links, and guide surfaces depending from the underside of the carrying surfaces for guiding the chain laterally relative to the rails, the maximum perpendicular distance between the guide surfaces formed on the carrying surfaces of the links being shorter than the minimum perpendicular distance between the guide surfaces formed on the rails and the guide surfaces at the underside of the carrying surfaces extending substantially perpendicularly thereto, characterized in that the hinge pin of the connecting system of the links is made of a ferromagnetic material, that, exclusively in the bend zones of the track, in the space between the two rails, under the connecting system of the links, at least one permanent magnet is provided for generating a magnetic field, the magnetic field lines of which in substance extend through the hinge pin, to attract the hinge pin.*

*19. A bend segment for a chain conveyor comprising a track and a conveyor chain, said track comprising two spaced parallel rails over which the chain can move, said chain having links presenting a substantially rectangular carrying surface made of non-ferromagnetic synthetic plastics material and a connecting system situated below said carrying surface and including at least two spaced eyes on one side of the link, at least one eye situated intermediate said spaced eyes on the opposite side of the link, all eyes being made of non-ferromagnetic synthetic plastics material, and a hinge pin for hinging adjacent links together, said hinge pin being embraced by the at least two spaced eyes connected to one of the links and the at least one eye situated intermediate said spaced eyes and connected to an adjacent link, the carrying surfaces, the hinge pins and the hinge eyes being designed so that the chain is capable of flexing not only about the hinge pins but also in the plane of transport defined by the carrying surfaces of the successive links, and guide surfaces depending from the underside of the carrying surfaces for guiding the chain laterally relative to the rails, the maximum perpendicular distance between the guide surfaces formed on the carrying surfaces of the links being shorter than the minimum perpendicular distance between the guide surfaces formed on the rails, characterized in that the hinge pin of the connecting system* of the links is made of a ferromagnetic material, that, exclusively in the bend zones of the track, in the space between the two rails, under the connecting system of the links, at least one permanent magnet is provided for generating a magnetic field, the magnetic field lines of which in substance extend through the hinge pin, to attract the hinge pin.

* * * * *